J. P. Lafetra,

Potato Digger.

No. 113,308. Patented Apr. 4, 1871.

Witnesses:

Inventor:
J. P. Lafetra
per Munn & Co
Attorneys.

United States Patent Office.

JOSEPH PRESTON LAFETRA, OF SHREWSBURY, NEW JERSEY.

Letters Patent No. 113,308, dated April 4, 1871.

IMPROVEMENT IN POTATO-DIGGERS.

The Schedule referred to in these Letters Patent and making part of the same.

*To all whom it may concern:*

Be it known that I, JOSEPH PRESTON LAFETRA, of Shrewsbury, (Eaton Town post office,) in the county of Monmouth and State of New Jersey, have invented a new and useful Improvement in Potato-Digger; and I do hereby declare that the following is a full, clear, and exact description thereof, which will enable others skilled in the art to make and use the same, reference being had to the accompanying drawing forming part of this specification, in which—

Similar letters of reference indicate corresponding parts.

Figure 1:
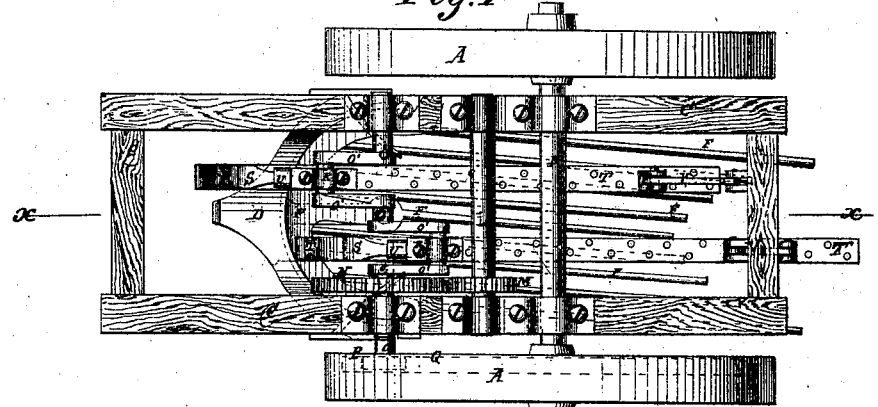
Figure 1 is a top view of my improved machine.
Figure 2:
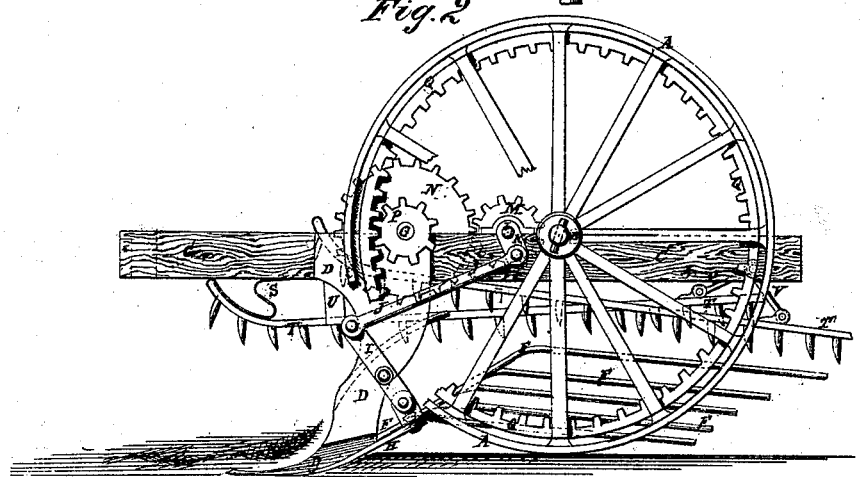
Figure 2 is a side view of the same, part of the drive-wheel being broken away to show the construction.
Figure 3:
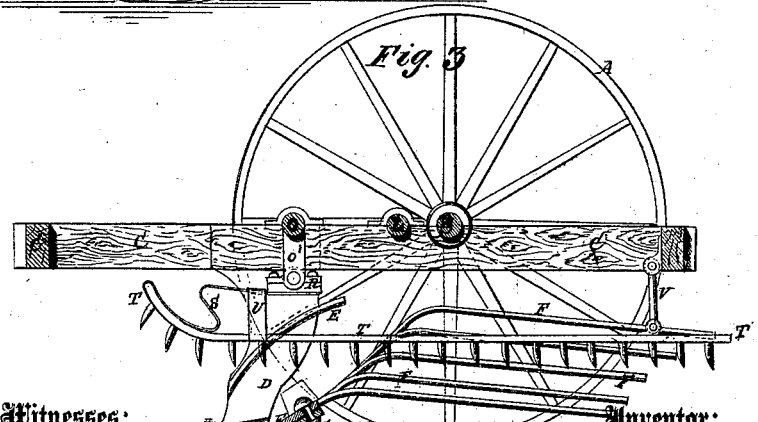
Figure 3 is a vertical longitudinal section of the same taken through the line *x x,* fig. 1.

My invention has for its object to furnish an improved potato-digger, which shall be simple in construction and effective in operation, being so constructed as to raise the potatoes from the ground, separate them from the soil raised with them, and leave the potatoes upon the top of the soil, with the vines spread loosely over them; and It consists in the construction and combination of various parts of the machine, as hereinafter more fully described.

A are the wheels, which are attached to the axle B so as to carry the said axle with them in their revolution.

The axle B revolves in bearings attached to the frame C.

D is the plow or shovel, the sides of which extend upward and are rigidly attached to the side bars of the frame C.

The forward edges of the sides of the shovel D are formed somewhat like the shear of an ordinary plow, so as to pass easily through the ground, and so that the stalks, grass, weeds, &c., which they may encounter may slide freely up them.

To the forward edge of the lower part of each of the sides of the shovel D is attached a finger, E, which is curved upward, inward, and rearward, to guide the stalks, vines, weeds, &c., inward, so as to pass back through the machine.

The rear edge of the shovel D is concaved and grooved to receive the curved forward edge of the shaker F.

The shaker F consists of a series of parallel rods or bars, the forward ends of which are attached to or formed with a curved cross-bar, which forms the forward end of the said shaker. The bars or rods of the shaker incline upward and rearward, and then extend to the rear end of the machine, inclining slightly downward, the side-rods being raised a little above the others to prevent the potatoes from passing off at the sides.

The forward part of the central rod or bar of the shaker is made stronger and heavier than the others, and through it is formed a hole to receive the bolt or rivet G, by which the shaker is pivoted to the arm H, said bolt or rivet being the center of the circle of which the curved forward end of the shaker is an arc.

The arm H is made sufficiently strong to support easily the shaker and the potatoes and soil that may be upon it, and its lower end is securely attached to or formed solidly upon the plow or shovel D.

I is a lever, which is pivoted to the upright side of the shovel D, and the lower end of which is pivoted to the end of the curved cross-bar of the shaker F, or to a lug attached to or formed upon said cross-bar, by a bolt or rivet, which passes through a slot in the lower end of the said lever.

To the upper end of the lever I is pivoted the lower end of the connecting-rod J, the upper end of which is pivoted to a short crank, K, attached to the end of the shaft L, which revolves in bearings attached to the frame O, and to which is attached a small gear-wheel, M.

The teeth of the small gear-wheel M mesh into the teeth of the large gear-wheel N, attached to the shaft O, which revolves in bearings attached to the frame C, and to one end of which is attached a gear-wheel, P.

The teeth of the gear-wheel P mesh into the teeth of the gear-wheel Q, attached to or formed upon the drive-wheel A.

Upon the shaft O are formed two or more double cranks, O', projecting in opposite directions, and to the crank-pins of which are pivoted the blocks or bearings R, attached to the upper ends of the scroll or S-springs S, the lower ends of which are attached to the forward parts of the rake-bars T.

The movement or play of the springs S is limited by the keepers U, attached to the said rake-bars T.

The rake-bars T extend back to, or nearly to, the rear end of the machine, have teeth attached to them, and have their forward ends slightly inclined or curved upward, to enable them to pass over the vines freely in their forward movement. For the same purpose, the rake-teeth attached to said bars should incline slightly to the rearward.

The rear parts of the rake-bars T are supported by the rods V, the lower ends of which are pivoted to the bars T, and the upper ends of which are pivoted to the frame C.

If desired, the rear ends of the rake-bars T may be provided with a crank arrangement similar to that at their forward ends.

The gearing for operating the rakes is so arranged that the said rakes may be moved to the rearward at about the same velocity as that at which the machine advances, so that the rakes may hold the potato-vines about stationary while the shaker shakes them and is drawn out from beneath them.

The springs S are designed to give elasticity to the rakes, so that they may "give," should a stone or other unyielding substance be passing back through the shaker.

Having thus described my invention,

I claim as new and desire to secure by Letters Patent—

1. A shovel, D, combined with the shaker F, pivoted to an arm, H, and extending upwardly and rearwardly, as described.

2. The rakes T, having springs, S, constructed as described, in combination with a shaker, for the purpose specified.

The above specification of my invention signed by me this 30th day of December, 1870.

JOSEPH PRESTON LAFETRA.

Witnesses:
    JAMES T. GRAHAM,
    GEO. W. MABEE.